(12) United States Patent
Deaver

(10) Patent No.: US 11,568,070 B2
(45) Date of Patent: Jan. 31, 2023

(54) SECURE ACCESS CONTROL PROCESSES

(71) Applicant: F. Scott Deaver, Menifee, CA (US)

(72) Inventor: F. Scott Deaver, Menifee, CA (US)

( * ) Notice: Subject to any disclaimer, the term of this patent is extended or adjusted under 35 U.S.C. 154(b) by 176 days.

(21) Appl. No.: 17/191,434

(22) Filed: Mar. 3, 2021

(65) Prior Publication Data

US 2021/0279348 A1    Sep. 9, 2021

Related U.S. Application Data

(62) Division of application No. 16/142,167, filed on Sep. 26, 2018, now Pat. No. 10,970,407.

(51) Int. Cl.
| | | |
|---|---|---|
| *H04L 29/06* | (2006.01) | |
| *G06F 21/62* | (2013.01) | |
| *G06F 21/60* | (2013.01) | |
| *H04L 9/08* | (2006.01) | |

(52) U.S. Cl.
CPC ............ *G06F 21/62* (2013.01); *G06F 21/602* (2013.01); *H04L 9/0891* (2013.01); *H04L 2209/08* (2013.01); *H04L 2209/26* (2013.01)

(58) Field of Classification Search
CPC ..... G06F 21/62; G06F 21/602; H04L 9/0891; H04L 2209/08; H04L 2209/26
USPC .......................................................... 380/28
See application file for complete search history.

(56) References Cited

U.S. PATENT DOCUMENTS

| 10,348,505 | B1* | 7/2019 | Crawforth | ............. G06F 21/602 |
| 2004/0052367 | A1 | 3/2004 | Yang et al. | |
| 2004/0165725 | A1* | 8/2004 | Kumar | ............... H04N 21/4147 |
| | | | | 348/E5.007 |
| 2006/0129805 | A1 | 6/2006 | Kim et al. | |
| 2012/0317534 | A1* | 12/2012 | Bhinge | ............ G01R 31/31835 |
| | | | | 716/136 |

* cited by examiner

*Primary Examiner* — Evans Desrosiers
(74) *Attorney, Agent, or Firm* — Cardle Patent Law CHTD

(57) ABSTRACT

A process of linking a key to a component is disclosed herein. In various aspects, the key may be a password, hash, key, encryption key, decryption key, seed value, unlock code, or other alphanumeric identifier, and the component includes a computer in networked communication, and may further include a specific user of the computer. The process may include the step of identifying a component using environmental variables associated with the component, and the process step of forming a representation of the key unique to the component. The representation is tested to determine that the identified component is the source of the representation, in various aspects. Accordingly, the process may include the step of testing the representation against previous representations thereby determining the representation is not statistically duplicative of previous representations, and the process may include the step of testing the representation against possible representations from the component where the possible representations are unique to the component.

12 Claims, 13 Drawing Sheets

SECURE ACCESS CONTROL PROCESSES

CROSS-REFERENCE TO RELATED APPLICATIONS

The present application is a divisional application of U.S. patent application Ser. No. 16/142,167 filed 26 Sep. 2018, which is hereby incorporated by reference in its entirety herein.

BACKGROUND OF THE INVENTION

Field

The present disclosure relates to Internet technology and, more specifically, to the validation of an input source by a computer.

Background

A major factor that has enabled nefarious activity on a computer is the acceptance by the computer of a key in the form of a set of alphanumeric characters. Key, as used herein, includes, for example, password, hash, key, encryption key, decryption key, seed value, unlock code, and other alphanumeric identifier. The computer validates an input source as an identified input source—a specific known input source—based upon input of the key by the input source that matches the expected key corresponding to the identified input source. If the input source inputs the key that the computer expects, the computer identifies the input source as the identified input source. Any input source that has possession of the key or information used to generate the key—the set of alphanumeric characters expected by the computer—is therefore validated as the identified input source whether or not the inputter of the key is, in fact, actually the identified input source.

It is precisely because the computer validates an input source based upon an exact match between the key and the expected key that hacking can occur. Once the key has been correctly input, the computer cannot determine the identity of the input source that entered the key because the key exactly matches what any input source would enter. In other words, once a key has been correctly input, the input source that input the key becomes identical to any other input source capable of entering the key as far as the computer can determine.

Thus, as a logical matter, a key is not a viable protection. Literal input of keys has cost economies trillions of dollars across decades and around the world. Hiding keys is a major technological focus. Social engineering, theft, hacking, and discovery to find and misuse keys is omnipresent. Key security is continually breached with major consequences as keys, for example, control access to financial transactions, personal records, databases of all sorts, military systems, and systems that control utilities and industrial processes of all sorts, all of which are continually being breached. Thus, the paradigm of literal key input has failed on a grand scale.

With respect to key as encryption key, the basic premise of most encryption is that given a unique key (usually, but not always, expressed as a string of alphanumeric characters) and the proper encryption algorithm, a digital asset can be made unusable and unrecognizable such that only the use of the key in combination with the correct complementary decryption algorithm can restore the encrypted digital asset to the original form. A variety of encryption algorithms are known, for example, that use keys of various lengths, that use encryption keys for encryption paired with decryption keys for decryption, that use public keys in combination with private keys, that use ciphers that encode in fixed block lengths or variable block lengths, and that use various techniques to seed random number generators.

The same key applied to the correct complementary decryption algorithm will always decrypt the encrypted digital asset, which is a blessing and a curse. The blessing is easy consistent operation. The curse is that any input source that obtains the key and applies the correct complementary decryption algorithm can decrypt the encrypted digital asset whether entitled to access the digital asset or not. This happens because the key is entered into the decryption algorithm via the input source literally. In other words, if the decryption algorithm expects pa$$word as the key, any input source that enters pa$$word into the decryption algorithm will decrypt the encrypted digital asset.

In addition, there is a common problem inherent to encryption algorithms that is the bane of IT professionals. Once a digital asset has been encrypted into an encrypted digital asset, the only way to prove that an input source is entitled to access the encrypted digital asset is 1) the input source proves the input source can decrypt the encrypted digital asset; or 2) the input source shares encryption key(s) and or decryption key(s) with the possessor of the encrypted digital asset. Both cases may be dangerous and expensive.

In the first case, the encrypted asset must be made accessible to all input sources regardless of the legitimacy of their claim because it is not knowable what the legitimacy of that claim is. In addition to the expenditure of time and resources (including denial of service to other entities), an input source as hacker is allowed unlimited access to the encrypted digital asset. Note that, for any given complementary encryption algorithm/decryption algorithm there is usually a fixed relationship between the encryption key(s), the encrypted digital asset output from the encryption algorithm, and the digital asset in unencrypted form, such that if any two of the three are known, given enough time and computing resources the third can be determined. Thus, a hacker with unlimited access to the encrypted digital asset and knowledge of the encryption algorithm used to create the encrypted digital asset may be able to determine the digital asset in unencrypted form, which is another major defect of standard encryption.

In the second case, private sensitive information is transmitted, and the entity receiving that information for validation cannot be guaranteed to be the possessor of the encrypted digital asset. In fact, the second case is the basis for all phishing attacks, where the hacker asks for proof of identity by the sending of sensitive information to the hacker.

Accordingly, there is a need for improved apparatus as well as related processes that, inter alia, allow a computer to validate an input source and that control access to encrypted digital assets.

BRIEF SUMMARY OF THE INVENTION

These and other needs and disadvantages may be overcome by the apparatus, processes, and compositions of matter disclosed herein. Additional improvements and advantages may be recognized by those of ordinary skill in the art upon study of the present disclosure.

A process for linking a key to a component is disclosed herein. In various aspects, the key may be a password, hash, key, encryption key, decryption key, seed value, unlock code, or other alphanumeric identifier, the component includes a computer in networked communication, and the component may further include a specific user of the computer. The process may include the process step of identifying the component using environmental variables associated with the component, and the process step of forming a representation of the key unique to said component. In various aspects, the key is represented by a random representation unique to the component. The representation is tested to determine that the identified component is the source of the representation, in various aspects. Accordingly, the process may include the process step of testing the representation against previous representations thereby determining the representation is not statistically duplicative of previous representations, and the process may include the process step of testing the representation against possible representations from said component where the possible representations are unique to the component. For example, the representation of the key, not the literal key, is used.

This summary is presented to provide a basic understanding of some aspects of the apparatus and processes disclosed herein as a prelude to the detailed description that follows below. Accordingly, this summary is not intended to identify key elements of the apparatus and processes disclosed herein or to delineate the scope thereof.

Figure 1A:
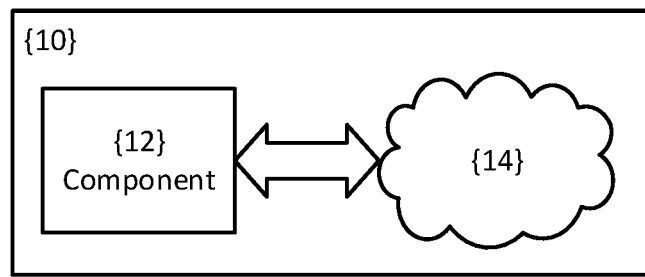
FIG. 1A illustrates by schematic diagram an exemplary access control apparatus.

The Figures are exemplary only, and the implementations illustrated therein are selected to facilitate explanation. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The process steps of the various processes illustrated in the Figures may be performed, for example, in other orders or the process steps may be divided or subdivided in various ways, in other implementations. Information flows and process flows in the Figures included herein are indicated by arrows, and it should be understood that additional information flows may occur between various components and that other process flows may occur, in various other implementations. Where used in the various Figures, the same numerals designate the same or similar elements. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure. The Figures including the apparatus, processes, and compositions of matter illustrated in the Figures are not to be considered limiting unless expressly so stated.

DETAILED DESCRIPTION OF THE INVENTION

A process for linking a key to component that has been identified is disclosed herein. In various aspects, the process for linking the key to an identified component includes the step of identifying the component using environmental variables associated with the component. In various aspects, the component includes a computer, and the component may further include a specific user of the computer with the computer and the specific user being identified. The process may include the step of forming a representation of the key that is unique to the component, and the step of testing the representation against possible representations from said component, the possible representations being unique to the component. In various aspects, the process may include the step of testing the representation against previous representations thereby determining the representation is not statistically duplicative of previous representations.

The key may be, for example, a password, hash, key, encryption key, decryption key, seed value, unlock code, or alphanumeric identifier. In various aspects, the key is represented by a random representation unique to the component of known identity. The representation of the key, not the literal key, is used to access various processes, and the representation is tested to determine that the identified component is the source of the representation, in various aspects. The representation and the component are linked to one another because the representation is unique to the component that is the source of the representation, in various aspects.

Literal key values are not used to directly to access various processes. The representation that is used to access various processes never matches exactly what any other component can use to access the various processes. If the representation exactly matches exactly what any component has ever input, the representation may be assumed to be a fraud—copied or hacked, for example.

A process for accessing an encrypted digital asset by a component is disclosed herein. In various aspects, the process includes the process steps of identifying the component and the component identifying the encrypted digital asset to a host that controls access to the encrypted digital asset. The process may include the process steps of passing an encryption set hash generated by the component to the host, and the host testing the encryption set hash thereby confirming that the component is entitled to access the encrypted digital asset.

Apparati are disclosed herein that implement the various process steps of the various processes. Compositions of matter are disclosed herein include non-transitory media that includes computer readable instructions that, when executed, cause one or more computers function as the apparatus or to implement the process steps of the processes.

Software may be, for example, in the form of high-level code such as C or Java, or may be in the form of machine code. In some aspects, the software may execute on one computer. In other aspects, two or more computers may communicate with one another via network, and the software may be organized in various ways such that portions of the software may be distributed operatively over the two or more computers to be executed by the two or more computers. Although generally described as implemented by software, the processes disclosed herein may be implemented in hardware or in a combination of hardware and software in various aspects. As would be recognized by those of ordinary skill in the art upon study of this disclosure, the processes, apparatus, and compositions of matter disclosed herein may be practiced in distributed computing environments where certain tasks are performed by processors that are linked by network. A nominal representation of data may either be the data itself or a pointer, description, or other data that may be used to create the data.

As used herein, computer may include a computer with one or more processors that may, in various aspects, include memory, display, mouse, keyboard, storage device(s), I/O devices, and so forth. Computer may include, for example, single-processor or multiprocessor computers, minicomputers, mainframe computers, as well as personal computers, hand-held computing devices, mobile devices, cellular telephones, tablets, and other processor-based devices. Display includes, for example, computer screen, video display, monitor, or other visual interface.

Network, as used herein, includes the Internet, local area networks, cell phone networks (e.g. 4G or 5G), text messaging networks (such as MMS or SMS networks), wide area networks, and combinations thereof. Data may be communicated over the network by various wired and wireless technologies and combinations of wired and wireless technologies. The network may include various data storage devices, input/output devices, computers, servers, routers, amplifiers, wireless transmitters, wireless receivers, optical devices, and so forth, as would be readily recognized by those of ordinary skill in the art upon study of this disclosure.

The compositions of matter disclosed herein include non-transitory computer readable media storing computer readable instructions that, when executed, perform at least some of the process steps of the processes disclosed herein.

Figure 1B:
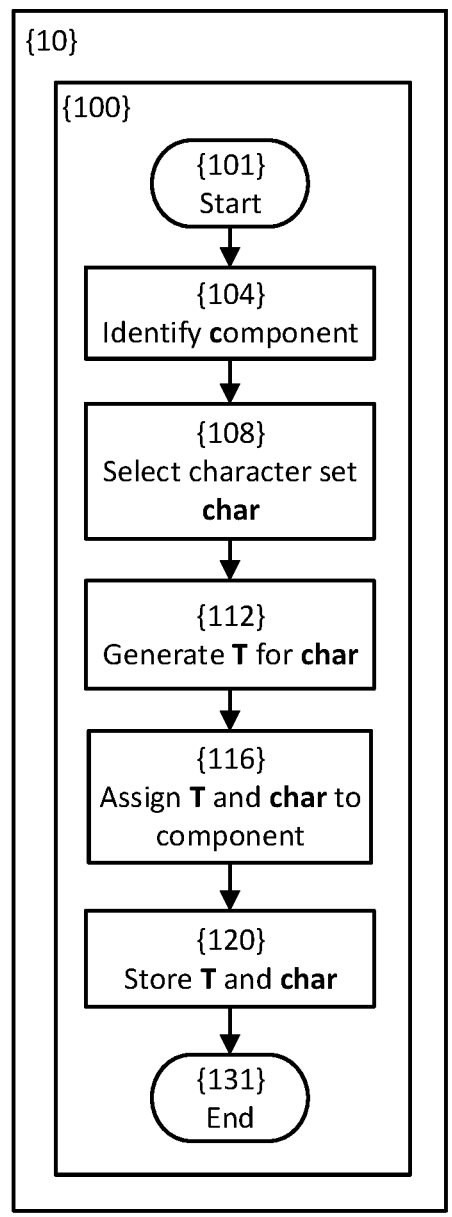
FIG. 1B illustrates by process flow chart an exemplary process of operation of the exemplary access control apparatus of FIG. 1A.
Figure 1C:
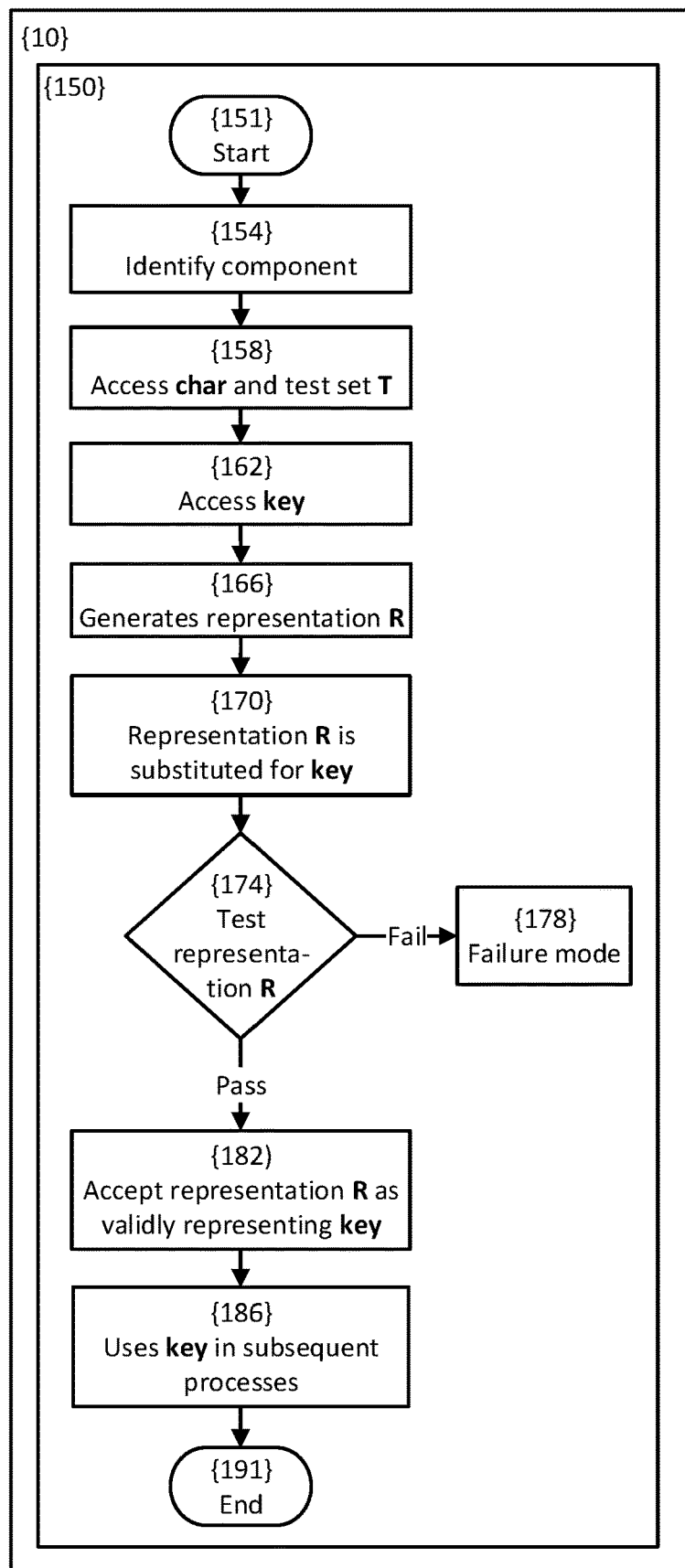
FIG. 1C illustrates by process flow chart another exemplary process of operation of the exemplary access control apparatus of FIG. 1A.

FIG. 1A illustrates exemplary access control apparatus 10. As illustrated in FIG. 1A, component 12 includes a computer, and component 12 may further include a specific user of the computer. Component 12 is in communication with network 14, as illustrated. FIGS. 1B, 1C illustrate exemplary processes 100, 150, respectively, of operation of access control apparatus 10. The process steps of processes 100, 150 may be implemented, at least in part, in network 14 using resources of network 14, in some implementations. The process steps of processes 100, 150 may be implemented entirely using component 12 without connection to network 14, in other implementations.

As illustrated in FIG. 1B, process 100 is entered at process step 101. At process step 104 of process 100, the identity of component 12 is identified so that the identity of component 12 is known. Identification of the identity of component 12 may be implemented, at least in part, in network 14. Component 12 may be authenticated using environmental variables associated with component 12 such as, for example, BIOS asset tag, hard-drive and other hardware serial numbers, MAC addresses, IPv4 and IPv6 Internet address, GPS location (obtainable in a variety of ways, including by triangulation of I/P addresses), and state information stored on component 12 that distinguish component 12 from any and all other components. Such identification methodologies are readily recognizable by those of ordinary skill in the art upon study of this disclosure, and may be bundled into APIs, libraries, and software applications by a variety of vendors and made available to developers. An example is Microsoft's Identity class distributed in Microsoft's .Net framework.

Component 12 includes a specific user, in certain implementations. A variety of methodologies readily recognizable by those of ordinary skill in the art upon study of this disclosure may be employed to identify the specific user such as, for example, two-factor authentication where the specific user is contacted asynchronously via another communications channel such as an SMS text messages, possesses a unique dongle, through use of biometric devices for fingerprint or retinal scanning, through use of credit card purchase information, through use of driver's license number, through use of Social Security number, or various combinations thereof.

At process step 108, component 12 selects character set char. The character set char may be, for example, hexadecimal numbers $\{0, 1, 2 \ldots f\}$, lowercase Roman alphabet $\{a, b, c, z\}$, lowercase and uppercase Roman alphabet $\{a, b, c \ z$ and $A, B, C, Z\}$, or ASCII characters. The character set char has n characters $\{char_1, char_2, \ldots char_n\}$, and each character chart E $\{char_1, char_i, \ldots char_n\}$.

At process step 112, a test array T of p ordered pairs $T_i = \{(a_{1,1}, a_{1,2}), (a_{2,1}, a_{2,2}), (a_{p,1}, a_{p,2})\}$ is generated at random for each character chart of the n characters in the character set char thereby forming test set $T = \{T_1, T_2 \ldots T_n\}$. Each test array $T_i$ in test set T is unique, in this implementation, so that test set T is unique to component 12. In various implementations, each test array $T_i$ of the n test arrays in test set T may have the same number of ordered pairs (p is constant for i=1 to n), or the number of ordered pairs in each of the n test arrays $T_i$ in test set T may vary (p varies as i=1 to n). In various implementations, the number of ordered pairs p may be on the order of $10^2$, $10^3$, $10^4$, or more.

Each ordered pair in test array $T_i$ defines an interval $I_i$, and test array $T_i$ defines n intervals $I_i$, in this implementation. The n intervals $I_i$ may be of random length and may be randomly distributed with respect to one another. For example, $(a_{1,1}, a_{1,2})$ define an interval $I_1$ between $a_{1,1}, a_{1,2}$ inclusive of endpoints $a_{1,1}, a_{1,2}$. Note that each interval $I_k$ is defined over machine representations of $a_{k,1}<a_k$ so that interval $I_k$ contains a finite number of numbers as limited by the machine representation not an infinite number of numbers. The intervals, such as interval $I_1$, may be at least two machine epsilon in length. The term machine epsilon, as used herein, means the 1+eps accuracy directly supported by a processor (or coprocessor) of the computer.

At process step 116, test set T and character set char are assigned to component 12, which had been identified as a specific component 12 as per process step 104. Character set char and corresponding test set T are stored in a secure manner, at process step 120. Process 100 terminates at process step 131.

As illustrated in FIG. 1C, process 150 is entered at process step 151. At process step 154 of process 150, component 12 is identified as being, in fact, the same component 12 specifically identified at process step 104 of process 100. Then, at process step 158, component 12, which was identified as component 12 at process step 154, accesses character set char and test set T that was stored as per process step 120 of process 100. At process step 162 component 12 accesses key where key has r key characters {kchar$_1$, kchar$_2$, ... kchar$_r$} and where each key character kchar$_j \in$ {char$_1$, char$_2$, ... char$_n$} for j=1 to r. Process steps 154, 158, 162 may be implemented, at least in part, using network 14. For example, network 14 may be used in identification per process step 154, test set T and character set char may be stored in network 14 and transmitted to component 12 upon successful completion of process step 154, or key may be accessed by component 12 using network 14, at process step 162. The identified user of component 12 may input key at process step 162.

At process step 166, for each key character kchar$_j$ where j=1 to r, component 12 generates a corresponding representation array $R_i$ from test array $T_i$ that corresponds to character char$_i$ equivalent to key character kchar$_j$, where char$_i$ is a character in the character set char selected in process step 108 of process 100.

At process step 170, representation R is substituted for key where representation R is the set of all the representation arrays $R_i$ ordered according to the key characters kchar$_j$ in key. Representation R={$R_f$, $R_g$, ... $R_h$} with representation array $R_f$ representing kchar$_1$, representation array $R_g$ representing kchar$_2$, ... representation array $R_h$ representing kchar$_r$. (Note f, g, h are integer indices.) For example, if kchar$_1$ is a lowercase letter b, then representation array $R_f$ is generated using test array $T_f$ that corresponds to character char$_f$ in character set char that is lowercase letter b. If, for example, kchar$_2$ is an uppercase letter V, then representation array $R_g$ is generated using test array $T_g$ that corresponds to character char$_g$ in character set char that is uppercase V.

Representation array $R_j$ for character char$_j$ in character set char is defined as $R_j$={$b_1$, $b_2$, ... $b_q$}. The elements $b_1$, $b_2$, ... $b_q$ of representation array $R_j$ are random values generated by component 12 using test array $T_j$ that corresponds to char$_j$ according to the requirement that the elements $b_1$, $b_2$, ... $b_q$ of the representation array $R_j$ for character char$_j$ lie within the intervals of the test array $T_j$ for char$_j$. That means $a_{k,1} \le b_k \le a_{k,2}$ for all k=1 to q where ($a_{k,1}$, $a_{k,2}$) are the ordered pairs of test array $T_j$ and q is the number of ordered pairs in test array $T_j$ (note that p=q). Thus, elements $b_1$, $b_2$, ... $b_q$ of representation array $R_j$ fall within intervals $I_1$, $I_2$, ... $I_q$ where interval $I_k$ is defined by $a_{k,1}<a_{k,2}$ for k=1 to q.

Figure 1D:
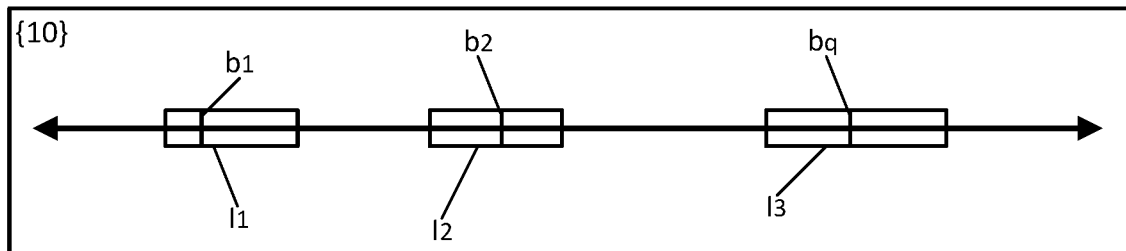
FIG. 1D illustrates by schematic diagram various features of the exemplary access control apparatus of FIG. 1A.

As illustrated in FIG. 1D, elements $b_1$, $b_2$, ... $b_q$ lie within intervals $I_1$=($a_{1,1}$, $a_{1,2}$), $I_2$=($a_{2,1}$, $a_{2,2}$), ... $I_q$=($a_{q,1}$, $a_{q,2}$), respectively. Intervals $I_1$, $I_2$, ... $I_q$ as defined by test array $T_j$ represent the possible representation arrays $R_j$ for character char$_j$, and are unique to component 12. Thus, test set T defines the possible representations R unique to component 12, as the values of any possible representation R must fall within the intervals defined by the test set T.

Figure 1E:
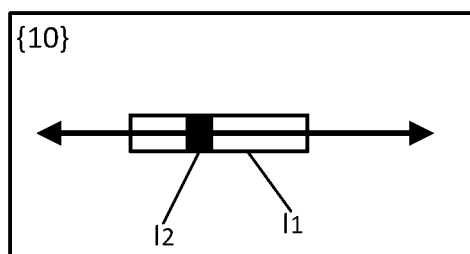
FIG. 1E illustrates by schematic diagram various features of the exemplary access control apparatus of FIG. 1A.
Figure 1F:
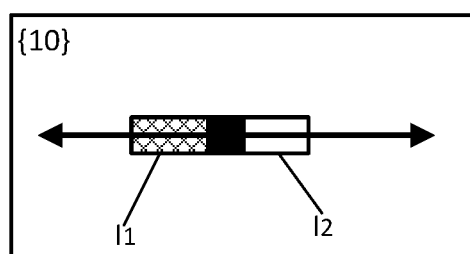
FIG. 1F illustrates by schematic diagram various features of the exemplary access control apparatus of FIG. 1A.
Figure 1G:
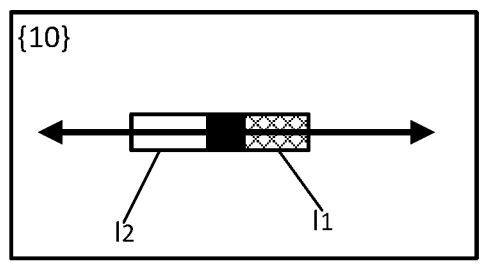
FIG. 1G illustrates by schematic diagram various features of the exemplary access control apparatus of FIG. 1A.

Intervals $I_1$, $I_2$, ... $I_q$ are non-overlapping, as illustrated in FIG. 1D. However, the intervals may be overlap at least in part or may be otherwise distributed with respect to one another. For example, interval $I_2$ (illustrated in solid black) may lie entirely within interval $I_1$ so that ($a_{1,1}<a_{2,1}<a_{2,2}<a_{1,2}$), as illustrated in FIG. 1E. For example, interval $I_2$ may overlap (overlap illustrated in solid black) interval $I_1$ with portions of interval $I_2$ to the right of interval $I_1$ on the number line ($a_{1,1}<a_{2,1}<a_{1,2}<a_{2,2}$), as illustrated in FIG. 1F. For example, interval $I_2$ may overlap interval $I_1$ with portions of interval $I_2$ to the left of interval $I_1$ (overlap illustrated in solid black) on the number line, so that ($a_{2,1}<a_{1,1}<a_{2,2}<a_{1,2}$), as illustrated in FIG. 1G.

At process step 174, each representation array $R_f$, $R_g$, ... $R_h$ of representation R is tested against corresponding test array $T_f$, $T_g$, ... $T_h$ of test set T to ensure that representation R was generated using test set T that only component 12 can access (per process steps 154, 158). In this implementation, the test at process step 174 includes the following subtests:

i) The number of elements q in each representation array $R_f$, $R_g$, ... $R_h$ must equal the number of intervals p in the corresponding test array $T_f$, $T_g$, ... $T_h$. Does q=p for each representation array $R_f$, $R_g$, ... $R_h$ and corresponding test array $T_f$, $T_g$, ... $T_h$?

ii) The elements of each representation array $R_f$, $R_g$, ... $R_h$ must fall within the intervals of the corresponding test array $T_f$, $T_g$, ... $T_h$. Is $a_{k,1} \le b_k \le a_{k,2}$ for all k=1 to p for each representation array $R_f$, $R_g$, ... $R_h$ and corresponding test array $T_f$, $T_g$, ... $T_h$?

iii) Each representation array $R_f$, $R_g$, ... $R_h$ must be statistically distinct from m previous representation arrays $R_f^{(l)}$, $R_g^{(l)}$, ... $R_h^{(l)}$ where 1 to m (superscript l indicates previously representation array submitted for char$_f$, char$_g$, ... char$_h$, and m may be, for example, on the order of $10^3$ or $10^4$) Representation R must be statistically distinct from m previous representations $R^{(l)}$.

If component 12 is in fact the same component 12 that generated test set T as determined at process step 154, then component 12 is allowed to access test set T at process step 158 and generate representation R for key at process step 166 that passes the subtests i, ii, iii of process step 174. Without test set T, any representation R for key submitted at process step 174 will not pass all of subtests i, ii, iii. For example, a previous representation R captured by hacking will not pass subtest iii as previous representation R will not be statistically different from m previous representations $R^{(l)}$ where 1 to m. As an example, representation array $R_j$ being equal to previous representation array $R_j^2$ may be indicative of an attempt to spoof process 150. Hacking that tries to generate a representation R is blocked by subtests i, ii, for example. Even knowledge of key does not allow passage of subtests i, ii, for example. Alteration of previous representation $R_j$* captured by hacking, for example, by altering the elements by various multiples of machine epsilon will likely either fail to be statistically distinct as required by subtest iii or one or more elements will fall outside the corresponding intervals thereby failing subtest ii.

If the test at process step 174 is failed, meaning, in this implementation, that representation R fails any of subtests i, ii, iii, then process 150 branches to process step 178 from process step 174. At process step 178, process 150 enters a failure mode that may, for example, include rejection of representation R and termination of process 150.

If the test at process step 174 is passed, meaning in this implementation that representation R passes all of subtests i, ii, iii, then process 150 branches from process step 174 to process step 182. Passage of the test at process step 174 uniquely links key with component 12 that has been identified per process step 154 because only component 12 can generate a valid representation R for key.

At process step 182, representation R is accepted as validly representing key, and key may be reconstructed using representation R, test set T, and character set char at process step 182.

Because key is now linked uniquely with component 12 that is identified per step, key may be used in subsequent processes available to component 12, for example, as a password, hash, key, encryption key, decryption key, seed value, unlock code, or other alphanumeric identifier, and may implement additional processes as, for example, may be initiated by receipt of valid key, per process step 186. Process 150 terminates at process step 191.

Accordingly, in exemplary process 150, the literal characters $kchar_1$, $kchar_2$, ... $kchar_r$ of key are not passed from process step 162 (access key) to process steps 182, 186, which are initiated by receipt of a valid key. Instead, representation R of key is passed to process step 182 and representation R is tested at process step 174 to determine that representation R of key is from identified component 12 before representation R is passed to process step 182. Passage of the test at process step 174 indicates that component 12 is the source of representation R of key as representation R is unique to component 12.

Figure 2A:
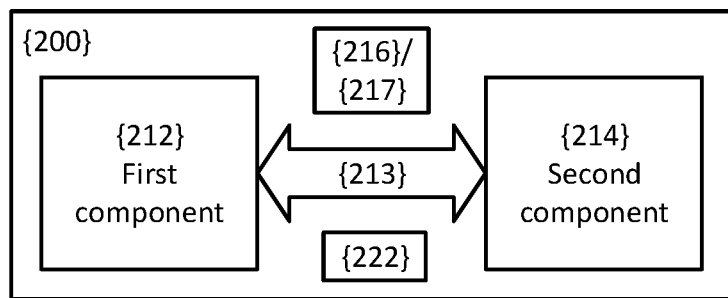
FIG. 2A illustrates by schematic diagram a second exemplary access control apparatus.
Figure 2B:
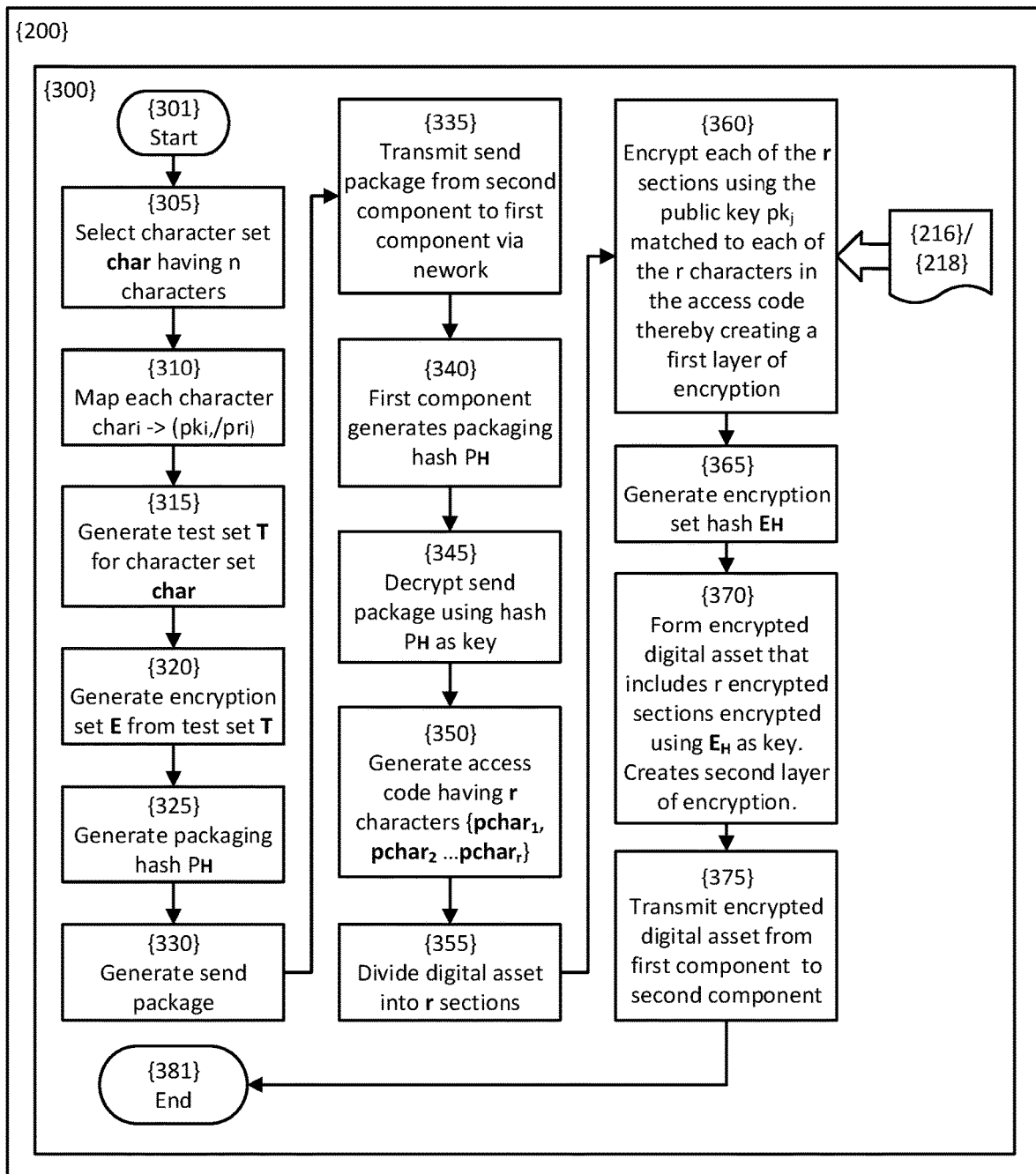
FIG. 2B illustrates by process flow chart an exemplary process of operation of the exemplary access control apparatus of FIG. 2A.
Figure 2C:
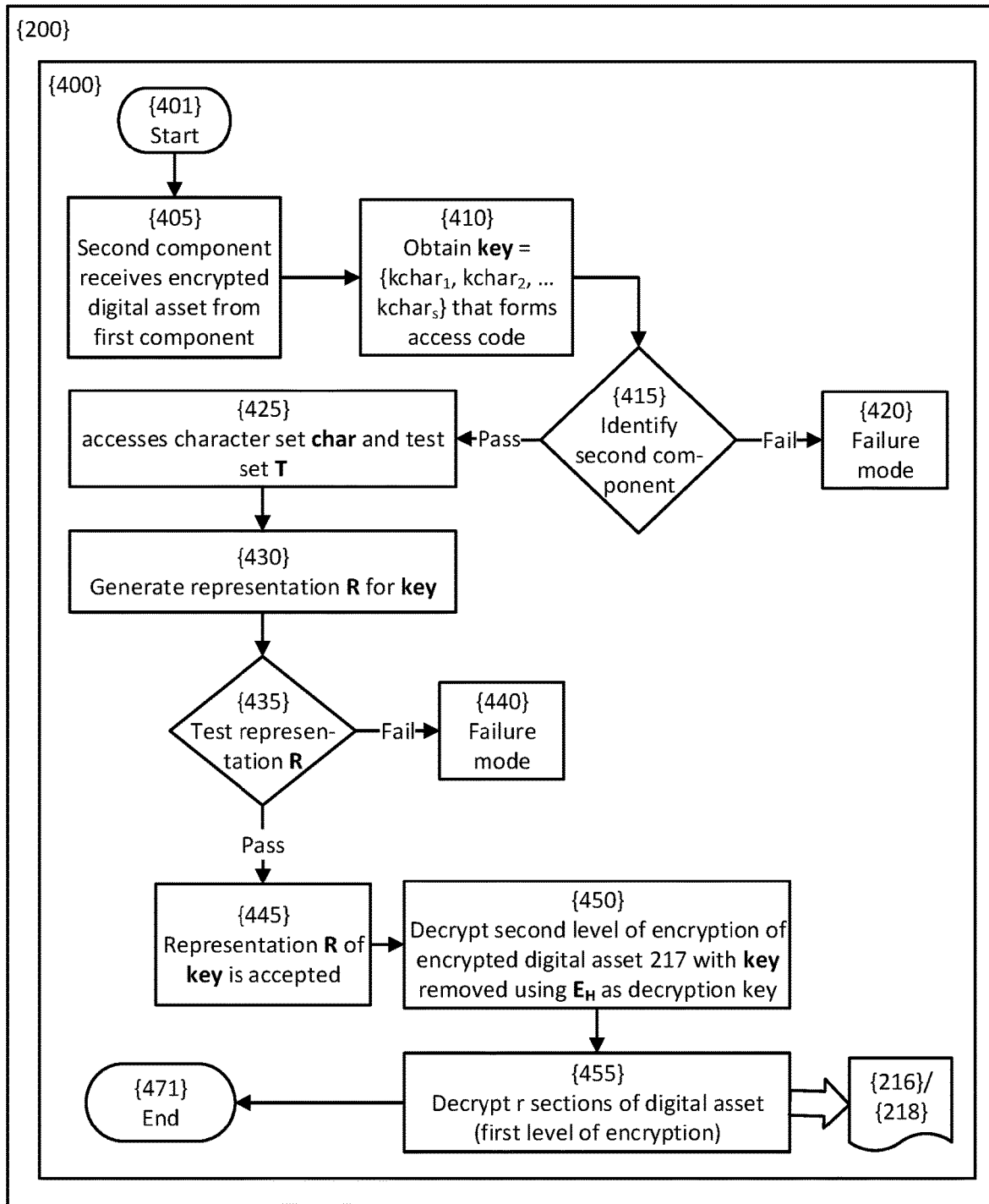
FIG. 2C illustrates by process flow chart another exemplary process of operation of the exemplary access control apparatus of FIG. 2A.

FIG. 2A illustrates exemplary access control apparatus 200, and FIGS. 2B, 2C illustrates exemplary processes 300, 400, respectively, of access control apparatus 200. Note that process steps of exemplary processes 300, 400 illustrated in FIGS. 2B, 2C may be implemented, at least in part, using network 213 including resources available within network 213 such as servers, networked computers, storage devices, and so forth, as would be readily recognized by those of ordinary skill in the art upon study of this disclosure.

As illustrated in FIG. 2A, access control apparatus 200 includes first component 212 and second component 214 in communication via network 213, with first component 212 and second component 214 being computers in various implementations. Various devices included in network 213 may moderate the communication between first component 212, second component 214, and at least portions of processes 300, 400 may be implemented in network 213, in various implementations.

In the implementation of FIG. 2A, second component 214, as the recipient, wants to receive a digital asset 216 from first component 212, as the sender, via network 213. Digital asset 216 may include, for example, software or data including textual, visual, and audio information. Second component 214 controls the transmission of digital asset 216 from first component 212 to second component 214, in this implementation. Thus, first component 212, the sender, cannot transmit digital asset 216 to second component 214, the recipient, without authorization from second component 214, in this implementation. Thus, second component 214, which is the recipient of digital asset 216, controls the transmission of digital asset 216 from first component 212 to second component 214.

Because, in this implementation, second component 214, which receives digital asset 216, controls the transmission of digital asset 216 from first component 212 to second component 214, the security considerations differ from implementations wherein the first component 212 controls the transmission of digital asset 216 from first component 212 to second component 214. In the implementation of FIGS. 2A, 2B, 2C, for example, second component 214 has no concern about the relationship first component 212 has with digital asset 216 because first component 212 is in possession of digital asset 216. Therefore, the only security concerns second component 214 has about first component 212 are a) to give first component 212 enough information to encrypt digital asset 216 into encrypted digital asset 217 so that only second component 214 can decrypt encrypted digital asset 217 but not enough information that first component 212 could, for example, access a different encrypted digital asset, for example, by pretending to be second component 214; and, b) to determine that digital asset 216 originated from first component 212. Thus, encryption set E and packaging hash $P_H$ along with public keys $pk_i$ where i=1 to n are used in exemplary process 300 in order to resolve security issues a) and b). Once security issues a) and b) are resolved, all security issues involving first component 212 are resolved and first component 212 is no longer part of the security conversation.

After resolution of security issue a) and security issue b), the remaining security issue becomes determining whether a recipient of encrypted digital asset 217 that claims to be second component 214 is actually the same second component 214 that created test set T per process step 315 of process 300. Or, for example, has encrypted digital asset 217 been intercepted by a hacker that is then attempting to decrypt encrypted digital asset 217? If second component 214 is, in fact, second component 214, then second component 214 will be allowed to access test set T and generate representation R that, for example, passes tests i, ii, iii of process step 166. If the hacker possesses encrypted digital asset 217 instead of second component 214, the hacker will not have access to the test set T generated by second component 214, and any representation R generated by the hacker will not, for example, pass tests i, ii, iii of process step 166 of exemplary process 150.

An exemplary process 300 is illustrated in FIG. 2B for transmitting the digital asset 216 from first component 212 to second component 214 of access control apparatus 200. Exemplary process 300 is initiated at process step 301. At process step 305, second component 214 selects a character set char having n characters.

At process step 310, second component 214 maps each character of the character set to a public key—private key pair so that one public key—private key pair corresponds to each character of the character set. That is $char_i \rightarrow (pk_i, pr_i)$ where i=1 to n, and where $pk_i$ is the public key paired with private key $pr_i$ At process step 315, second component 214 generates a test set T for the character set char. Test set identifier TID and test set owner identifier TSOID are associated with test set T by second component 214.

At process step 320, second component 214 generates an encryption set E from test set T with the elements of encryption set E having a one to one correspondence with the elements of test set T. In various implementations, floating point values may be 128 bit structure with a 64 bit integer plus a 64 bit fractional component or may be 64 bit structure with 32 bit integer plus a 32 bit fractional component. The encryption set E includes only the fractional components of the ordered pairs of the test arrays that comprise test set T. For example, element E of encryption set E is formed from corresponding test array and includes only the fractional components of $a_{1,1}, a_{1,2}, a_{2,1}, a_{2,2}, \ldots a_{p,1}, a_{p,2}$ where test array $T_i = \{(a_{1,1}, a_{1,2}), (a_{2,1}, a_{2,2}), \ldots (a_{p,1}, a_{p,2})\}$ has p ordered pairs that define corresponding intervals $I_1, I_2, \ldots I_p$.

At process step 325, the sender identifier SID that identifies first component 212 (second component 214 needs to identify first component 212), test set identifier TID, and test set owner identifier TSOID are then hashed by second component 214 as a group to generate packaging hash $P_H$. Note that packaging hash $P_H$ is a scalar quantity.

As used herein, a hash, such as packaging hash $P_H$ or encryption set hash $E_H$, is the output result of a hashing algorithm, such as MD4, MD5, SHA-1, SHA-2, RIPEMD-160, Whirlpool, and BLAKE2, that operates on an array. The hashing algorithm, for example, generates a unique, fixed size 256-bit (32-byte) hash. The hash cannot be reversed to generate the array, so that, for example, encryption set hash $E_H$ cannot be reversed into encryption set E. When the same hashing algorithm is used to hash two different arrays (that may have either the same number of bytes or a different number of bytes), the resulting hashes will be different. Conversely, the hashing algorithm should produce the same hash for any two arrays of the same size containing the same bytes in the same order even when the hashing algorithm operates on different operating systems, devices, or file systems. Because the hashing algorithm will produce a consistently-sized hash no matter the size or contents of the array being hashed, hashes can be used to identify uniquely the corresponding array in situations where a consistently uniform data size is required for storage of a reference to the source array. For example, encryption set hash $E_H$ may be used to identify encryption set E. In various implementations disclosed herein, the same hashing algorithm is used in all operations thereby allowing comparisons to be made of hashes across time, operating systems, devices, and file systems. Note that the various exemplary processes disclosed herein may require generation of the hash, such as packaging hash $P_H$ or encryption set hash $E_H$, when the hash is required by a process step. This avoids storage or transmission of the hash because storage or transmission of the hash may negatively impact security.

At process step 330, second component 214 generates send package 222 that includes the n public keys $pk_i$ of the n public key—private key pairs ($pk_i$, $pr_i$) encrypted using packaging hash $P_H$ as key, the encryption set E encrypted using packaging hash $P_H$ as key, and character set char encrypted using packaging hash $P_H$ as key. Send package 222 includes the test set identifier TID, and the test set owner identifier TSOID accessibly published therein.

At process step 335, second component 214 transmits the send package 222 and to first component 212 via network 213.

At process step 340, first component 212 generates packaging hash $P_H$ by hashing sender identifier SID (which is known to first component 212), test set identifier TID, and test set owner identifier TSOID. Test set identifier TID and test set owner identifier TSOID may be published within a file header of send package 222.

At process step 345, first component 212 decrypts send package 222 using packaging hash $P_H$ as key to access the encryption set E, the n public keys $pk_i$, and the character set char.

At process step 350, first component 212 generates key={$kchar_1$, $kchar_2$, . . . $kchar_r$} that forms an access code having r key characters $kchar_1$ to $kchar_r$ each of which are elements of character set char.

At process step 355, first component 212 divides digital asset 216 into r sections in correspondence to the r key characters in key.

Figure 2D:
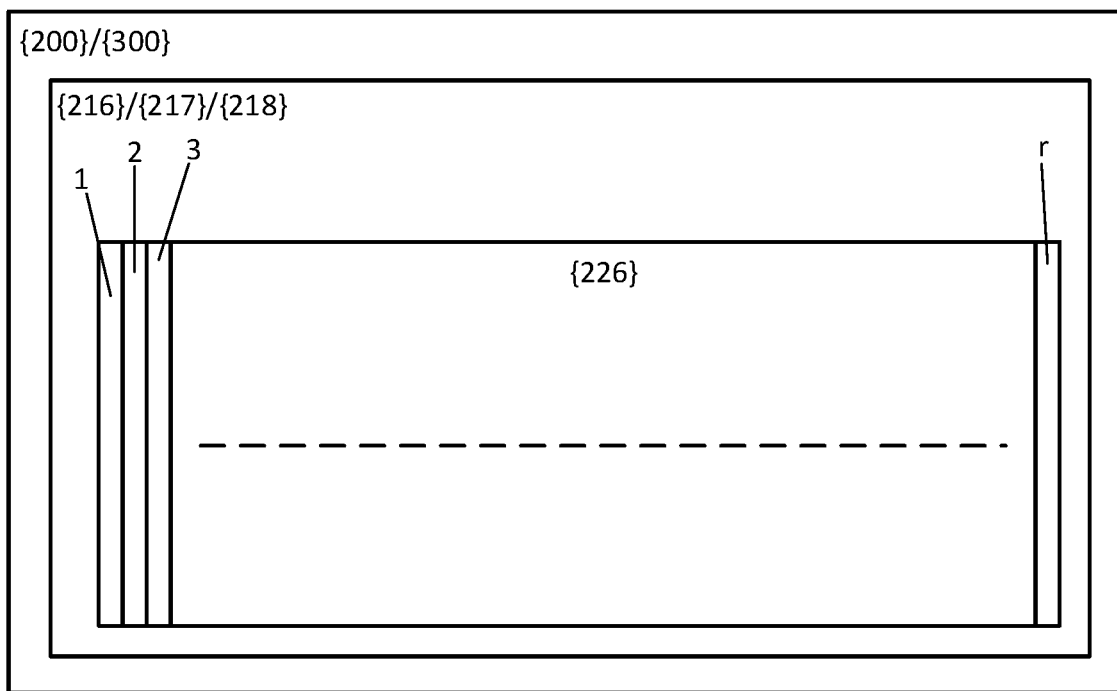
FIG. 2D illustrates by schematic diagram an exemplary encrypted digital asset as may be employed in the exemplary processes illustrated in FIGS. 2B, 2C.

At process step 360, first component 212 encrypts each of the r sections of digital asset 216 using the public key $pk_j$ where j=1 to r matched to the r key characters in key thereby creating a first layer of encryption 226, as illustrated in FIG. 2D. For example, section 1 of digital asset 216 is encrypted using public key $pk_j$ matched to key character $kchar_1$, section 2 of digital asset 216 is encrypted using public key $pk_k$ matched to key character $kchar_2$, and so forth At process step 365, first component 212 generates encryption set hash $E_H$ by hashing test set owner identifier TSOID, test set identifier TID, and r encryption arrays $E_f$, $E_g \ldots E_h$ that correspond one to one with the r key characters $kchar_1, kchar_2, \ldots kchar_r$ in key.

At process step 370, test set identifier TID, test set owner identifier TSOID, and r encrypted sections of the digital asset 216 are interleaved by first component 212 and then encrypted into encrypted digital asset 217 using $E_H$ as key of a second layer of encryption 228, as illustrated in FIG. 2D. In certain implementations, key may be included in encrypted digital asset 217 in a way known to and accessible by second component 214 thus allowing second component 214 to access key in encrypted digital asset 217. Then encrypted digital asset 217 is transmitted from first component 212 to second component 214. Process 300 terminates at process step 381.

Upon receiving the encrypted digital asset 217, second component 214 then implements the following process steps of exemplary process 400, which is illustrated in FIG. 2C, in order to decrypt encrypted digital asset 217 into digital asset 216 as decrypted file 218.

Process 400 is initiated at process step 401. At process step 405, second component 214 receives encrypted digital asset 217 from first component 212.

At process step 410, key with r key characters $kchar_1$ to $kchar_r$ that forms access code is obtained by second component 214. Second component 214 obtains key, for example, by other transmissions from first component 212 or from user inputs, in various implementations. Alternatively, if key was embedded into the encrypted digital asset 217 per process step 365 of process 300, second component 214 may extract key from encrypted digital asset 217.

At process step 415, second component is identified to verify that second component 214 is in fact the second component 214 that selected character set char and generated test set T per process steps 305, 315, respectively, of process 300.

At process step 420, if identification at process step 415 is failed, then process 400 advances to process step 420 that implements a failure mode.

At process step 425, if identification at process step 415 is passed, then second component 214 accesses character set char and test set T. Character set char and test set T may be stored in network 213, and process steps 312, 316 may be implemented, at least in part, using network 213.

At process step 430, second component 214 generates representation R={$R_f$, $R_g$, . . . $R_h$} where representation array $R_f$ represents key character $kchar_1$, representation array $R_g$ represents key character $kchar_2$, . . . representation array $R_h$ represents key character $kchar_r$ using the corresponding test arrays $T_f$, $T_g$, . . . $T_h$ for characters $kchar_1$, $kchar_2$, . . . $kchar_r$ that form key, where $kchar_1$, $kchar_2$, . . . $kchar_r$ are elements of character set char.

At process step 435, each representation array $R_f$, $R_g$, . . . $R_h$ in representation R and representation R as a whole are tested. In order to pass this test, representation arrays $R_f, R_g, \ldots R_h$ must be statistically distinct from m previous representation arrays $R_f^l, R_g^l, \ldots R_h^l$ where 1 to m (superscript l indicates previously representation array submitted for $char_f, char_g, \ldots char_h$, and m may be, for example, on the order of $10^3$ or $10^4$) Representation R as a whole must be statistically distinct from m previous representations $R^l$.

If the test at process step 435 is failed, meaning representation R is not statistically distinct, then process 400 advances from process step 435 to process step 440 where a failure mode is entered. If the test at process step 435 is passed, meaning representation R is statistically distinct, then process 400 advances from process step 435 to process step 445 where a failure mode is entered.

At process step 445, representation R is accepted as validly indicating key, and key may be reconstructed using representation R, test set T, and character set char. Passage of the test at process step 435 links key with second component 214 that has been identified per process step 415 because only second component 214 can generate a valid representation R for key.

At process step 450, second component 214 then decrypts encrypted digital asset 217 with key removed using $E_H$ as the key thereby decrypting second layer of encryption 228 of encryption.

At process step 455, each of the r sections of digital asset 216 is decrypted using the corresponding private keys $pr_f, pr_g, \ldots pr_h$ matched to the r key characters $kchar_1, kchar_2, \ldots kchar_r$ in key. For example, section 1 of encrypted digital asset 217 is decrypted using private key $pr_f$ matched to key character $kchar_1$, section 2 of encrypted digital asset 217 is decrypted using private key $pr_g$ matched to key character $kchar_2$, and so forth until section r is decrypted using private key $pr_h$ matched to key character $kchar_r$. Digital asset 216 is then output as decrypted file 218 which is now available to second component 214 for additional processing. Process 400 terminates at process step 471.

Figure 3A:
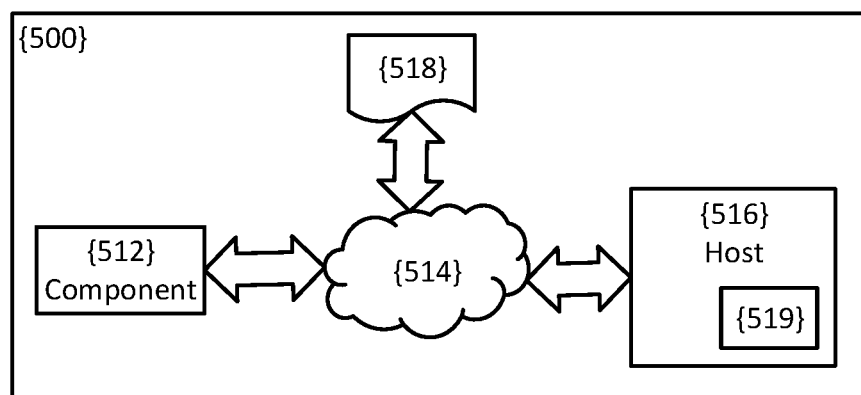
FIG. 3A illustrates by schematic diagram a third exemplary access control apparatus.
Figure 3B:
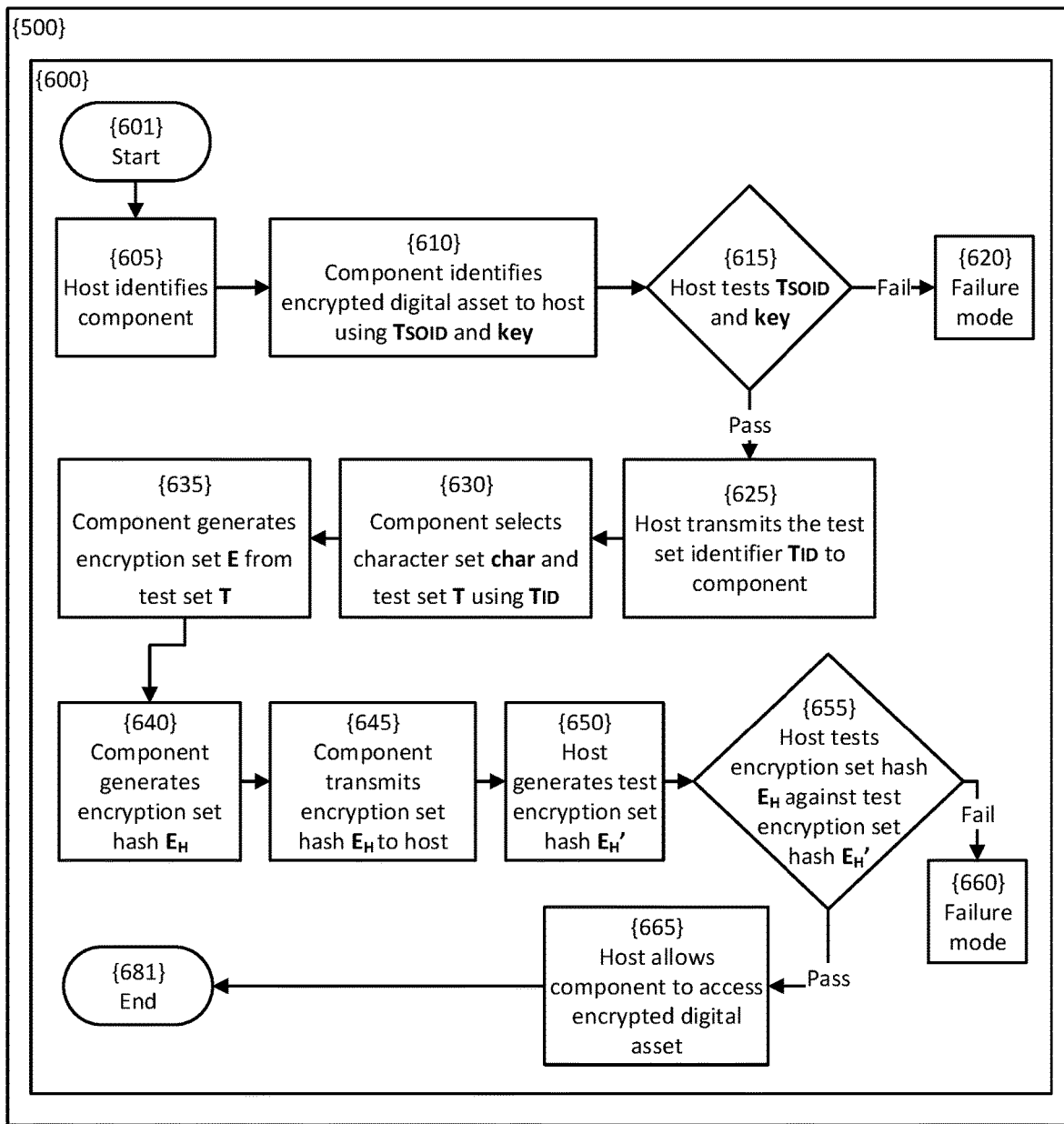
FIG. 3B illustrates by process flow chart an exemplary process of operation of the exemplary access control apparatus of FIG. 3A.
Figure 3C:
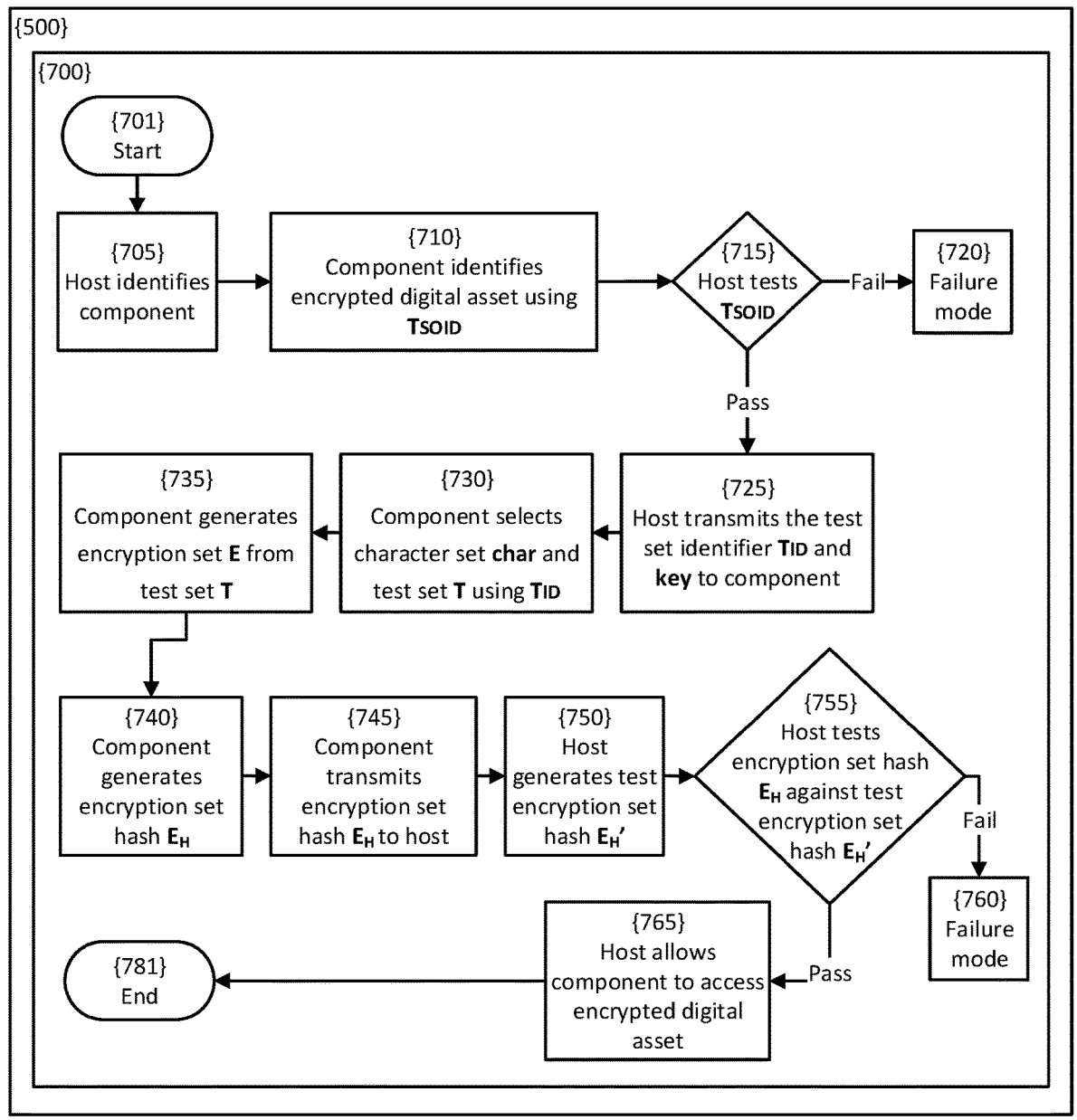
FIG. 3C illustrates by process flow chart another exemplary process of operation of the exemplary access control apparatus of FIG. 3A.
Figure 3D:
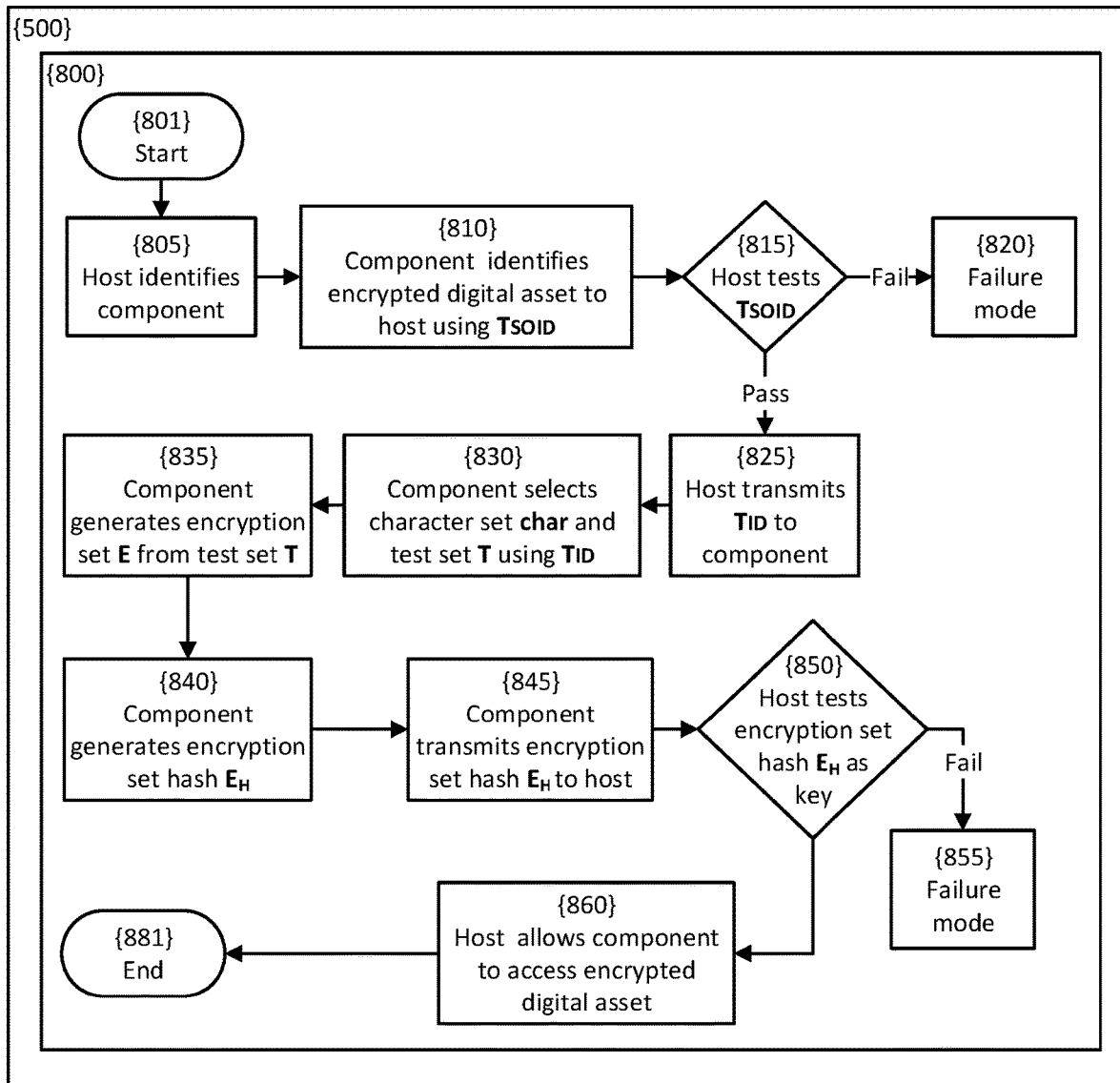
FIG. 3D illustrates by process flow chart a third exemplary process of operation of the exemplary access control apparatus of FIG. 3A.

Once a digital asset, such as digital asset 216, has been encrypted into an encrypted digital asset, such as encrypted digital asset 217, access of a component, such as component 12, 212, to the encrypted digital asset may be controlled, for example, to prevent access to the encrypted digital asset by components not entitled to access the encrypted digital asset. FIG. 3A illustrates exemplary access control apparatus 500, and FIGS. 3B, 3C, 3D illustrates exemplary processes 600, 700, 800 of operation, respectively, of access control apparatus 500 that controls access to the encrypted digital asset.

As illustrated in FIG. 3A, component 512 and host 516 are computers in communication with the network 514 as is encrypted digital asset 518 that is to be accessed by component 512. Component 512 may further include a specific user of the computer. Host 516 acts as an intermediary between component 512 and encrypted digital asset 518. Processes 600, 700, 800 exemplify three different scenarios of controlling access to encrypted digital asset 518 by component 512.

In exemplary process 600, component 512 has access to key=$\{kchar_1, kchar_2, \ldots kchar_r\}$ that forms the access code (as in exemplary processes 300, 400) for encrypted digital asset 518, and key is included in the encrypted digital asset 518.

Process 600 is initiated at process step 601. At process step 605, host 516 is in secure communication with component 512 via network 514, and host 516 identifies component 512.

At process step 610, component 512 identifies an encrypted digital asset 518 to host 516 that component 512 seeks to access by sending test set owner identifier TSOID and key to host 516.

At process step 615, host 516 tests for match between test set owner identifier TSOID and key transmitted to host 516 by component 512 with the test set owner identifier TSOID used for encrypting encrypted digital asset 518 and key embedded in encrypted digital asset 518. If the test fails (no match), process 600 branches from process step 615 to process step 620. A failure mode is then initiated at process step 620. If the test passes (match), process 600 branches from process step 615 to process step 625.

At process step 625, host 516 transmits the test set identifier TID of test set T to component 512, where test set T was used in the encryption of encrypted digital asset 518.

At process step 630, component 512 selects character set char and component 512 selects test set T using TID.

At process step 635, component 512 generates encryption set E from test set T.

At process step 640, component 512 generates encryption set hash $E_H$ by hashing test set owner identifier TSOID, test set identifier TID, and r encryption arrays $E_f, E_g, \ldots E_h$ that correspond one to one with the r key characters $kchar_1, kchar_2, \ldots kchar_r$ in key.

At process step 645, component 512 transmits encryption set hash $E_H$ to host 516.

At process step 650, host 516 generates test encryption set hash $E_H'$ by hashing test set owner identifier TSOID, test set identifier TID, and r encryption arrays $E_f', E_g', \ldots E_h'$ that correspond one to one with the r key characters $kchar_1, kchar_2, \ldots kchar_r$ in key wherein encryption array $E_j'$ where the r encryption arrays $E_f', E_g', \ldots E_h'$ used during encryption of encrypted digital asset 518.

At process step 655, host 516 tests encryption set hash $E_H$ against test encryption set hash $E_H'$. If hash $E_H$ does not match test encryption set hash $E_H'$ then process 600 branches from process step 655 to process step 660, and a failure mode is initiated at process step 660. If hash $E_H$ matches test encryption set hash $E_H'$ then process 600 branches from process step 655 to process step 665.

At process step 665, host 516 allows component 512 to access encrypted digital asset 518. Process 600 terminates at process step 681.

In exemplary process 700, key=$\{kchar_1, kchar_2, \ldots kchar_r\}$ that forms the access code (as in exemplary processes 300, 400) for encrypted digital asset 518 is included in the encrypted digital asset 518, but component 512 does not have access to key at the initiation of process 700.

Process 700 is initiated at process step 701. At process step 705, host 516 and component 512 are in secure communication via network 514, and host 516 identifies component 512.

At process step 710, component 512 identifies encrypted digital asset 518 to host 516 that component 512 seeks to access by sending test set owner identifier TSOID to host 516.

At process step 715, host 516 tests for match between test set owner identifier TSOID transmitted to host 516 by component 512 with test set owner identifier TSOID used for encrypting encrypted digital asset 518. If the test fails (no match), process 700 branches from process step 715 to process step 720. A failure mode is then initiated at process step 720. If the test passes (match), process 700 branches from process step 715 to process step 725.

At process step 725, host 516 transmits the test set identifier TID of test set T and key to component 512, where test set T was used in the encryption of encrypted digital asset 518 and key is included in the encrypted digital asset 518. Host 516 accesses encrypted digital asset 518 to obtain key.

At process step 730 Component 512 selects character set char and component 512 selects test set T that corresponds to TID.

At process step 735, component 512 generates encryption set E from test set T.

At process step 740, component 512 generates encryption set hash $E_H$ by hashing test set owner identifier TSOID, test set identifier TID, and r encryption arrays $E_f, E_g, \ldots E_h$ that correspond one to one with the r key characters $kchar_1, kchar_2, \ldots kchar_r$ in key.

At process step 745, component 512 transmits encryption set hash $E_H$ to host 516.

At process step 750, host 516 generates test encryption set hash $E_H'$ by hashing test set owner identifier TSOID, test set identifier TID, and r encryption arrays $E_f', E_g', \ldots E_h'$ that correspond one to one with the r key characters $kchar_1, kchar_2, \ldots kchar_r$ in key wherein the r encryption arrays $E_f', E_g', \ldots E_h'$ were used during encryption of encrypted digital asset 518. Note that host 516 obtains key from encrypted digital asset 518.

At process step 755, host 516 tests encryption set hash $E_H$ against test encryption set hash $E_H'$. If hash $E_H$ does not match test encryption set hash $E_H'$ then process 700 branches from process step 755 to process step 760, and a failure mode is initiated at process step 760. If hash $E_H$ matches test encryption set hash $E_H'$ then process 700 branches from process step 755 to process step 765.

At process step 765, host 516 allows component 512 to access encrypted digital asset 518. Process 700 terminates at process step 781.

In exemplary process 800, key={$kchar_1, kchar_2, \ldots kchar_r$} that forms the access code (as in exemplary processes 300, 400) for encrypted digital asset 518 is not included in the encrypted digital asset 518 so that host 516 does not have access to key at the initiation of process 800. Component 512 has access to key at the initiation of process 800.

Process 800 is initiated at process step 801. At process step 805, host 516 identifies component 512 via secure communication through network 514.

At process step 810, component 512 identifies an encrypted digital asset 518 to host 516 that component 512 seeks to access by sending test set owner identifier TSOID to host 516

At process step 815, host 516 tests for match between test set owner identifier TSOID transmitted to host 516 by component 512 with test set owner identifier TSOID used for encrypting encrypted digital asset 518. If the test at process step 815 fails (no match), process 800 branches from process step 815 to process step 820, and a failure mode is then initiated at process step 820. If the test at process step 815 passes (match), process 800 branches from process step 815 to process step 825.

At process step 825, host 516 transmits to component 512 the test set identifier TID of test set T that was used in the encryption of encrypted digital asset 518.

At process step 830, component 512 selects character set char and component 512 selects test set T using TID.

At process step 835, component 512 generates encryption set E from test set T.

At process step 840, component 512 generates encryption set hash $E_H$ by hashing test set owner identifier TSOID, test set identifier TID, and the r encryption arrays $E_f, E_g, \ldots E_h$ that correspond one to one with the r key characters $kchar_1, kchar_2, \ldots kchar_r$ in key.

At process step 845, component 512 transmits encryption set hash $E_H$ to host 516.

At process step 850, host 516 uses encryption set hash $E_H$ as key to decrypt encrypted digital asset 518 and produce a valid result. This decryption may be done is secure space. Note that only the second layer of encryption 228 is decrypted by encryption set hash $E_H$ as key. The first layer of encryption 226 remains because host 516 cannot access the r private keys $pr_f, pr_g, \ldots pr_h$ matched to the r key characters $kchar_1, kchar_2, \ldots kchar_r$ in key that are necessary for complete decryption. It may not be desirable from a security standpoint for host 516 to have access to the private keys $pr_f, pr_g, \ldots pr_h$.

If a valid result is not produced using encryption set hash $E_H$ as key at process step 850, then process 800 branches from process step 850 to process step 855 where a failure mode is entered. If a valid result is produced by encryption set hash $E_H$ as key at process step 850, then process 800 branches from process step 850 to process step 860.

At process step 860, host 516 allows component 512 to access encrypted digital asset 518. Process 800 terminates at process step 881.

Figure 4:
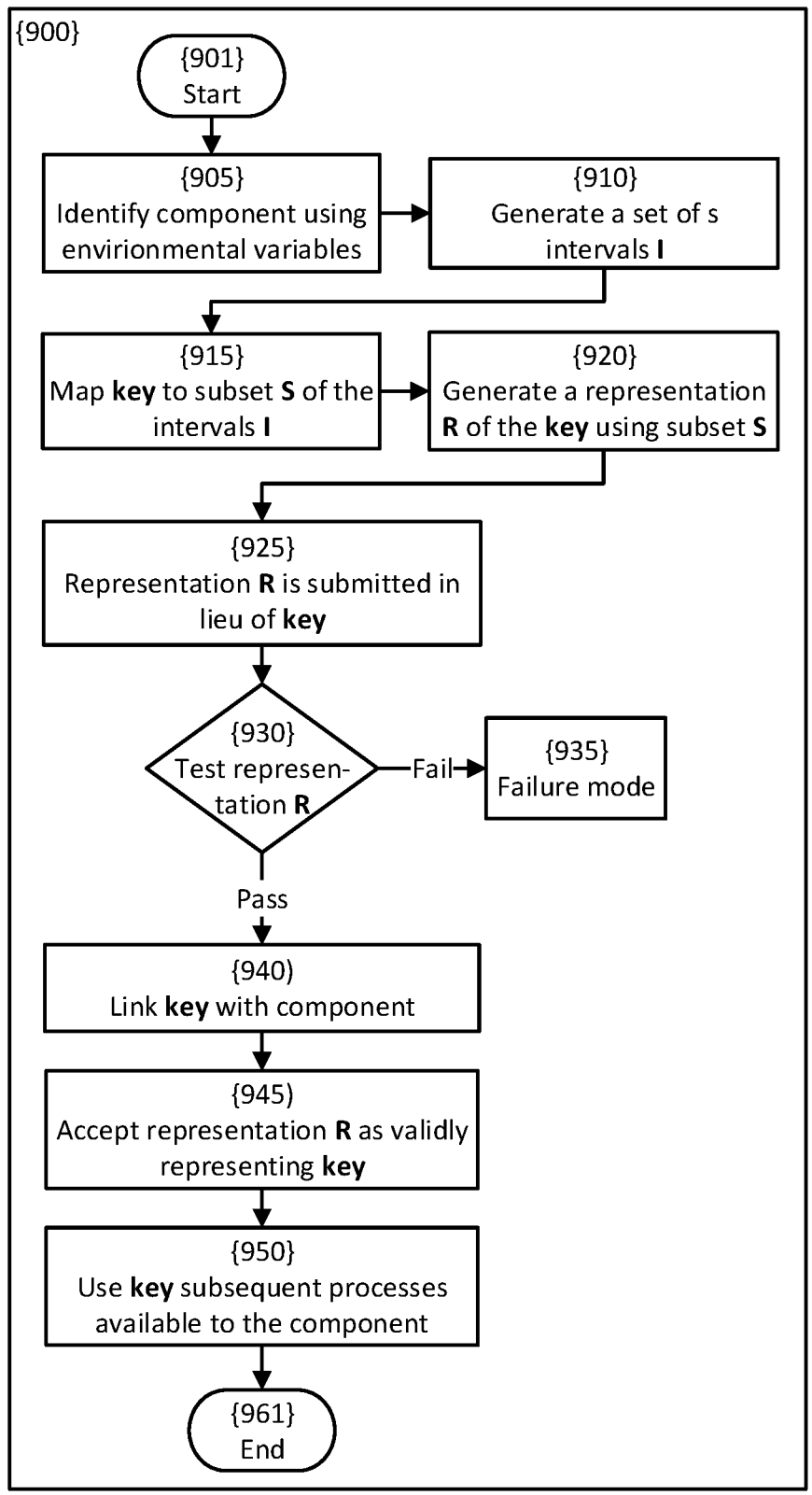
FIG. 4 illustrates by process flow chart an exemplary process of operation of the exemplary access control apparatus of FIGS. 1A, 2A, and 3A.

Exemplary process 900 for linking a key to an identified component is illustrated in FIG. 4. As illustrated in FIG. 4, process 900 is initiated at process step 901. At process step 905, a component is identified using environmental variables associated with the component. The component may include a specific user and the specific user is identified at process step 905.

At process step 910, the component generates a set of s intervals I={$I_1, I_2, \ldots I_s$} randomly spaced that are unique where intervals I includes all of the intervals in test set T. The intervals I are associated securely with the component.

At process step 915, a key is mapped to a subset S={$I_i, I_j, \ldots I_k$} of the intervals I. For example, key has r key characters {$kchar_1, kchar_2, \ldots kchar_r$} that are mapped to the corresponding test arrays $T_f, T_g, \ldots T_h$ for characters $kchar_1, kchar_2, \ldots kchar_r$. The intervals in test arrays $T_f, T_g, \ldots T_h$ form subset S where subset S is a subset of the intervals I.

Subset S has t elements where t<s and subset S is unique to the component because intervals I, of which subset S is a subset, is unique to the component. Subset S is unique to the key, as a different key maps to a different subset S. In various implementations, the number of intervals $I_i$ (elements) in subset S may be generally in the range $10 < t < 10^7$. The number of intervals $I_i$ in subset S may be even greater than $10^7$ constrained by execution time and computer capacity considerations, in various implementations.

At process step 920, the component generates a representation R of the key using subset S where representation R={$b_1, b_2, \ldots b_t$}. The randomly generated elements $b_1, b_2, \ldots b_t$ each lie randomly within corresponding intervals $I_i, I_j, \ldots I_k$ of subset S. For example, $b_1$ lies within interval $I_i$, $b_2$ lies within interval $I_j$, and $b_t$ lies within interval $I_k$. Because subset S is unique to the component and to the key, representation R is unique to the component and to the key. Only the component generates the representation R, and representation R may be used to identify the component as there is a unique one-to-one correspondence between the component and representation R.

At process step 925, representation R is submitted in lieu of key.

At process step 930, representation R is tested by testing that elements $b_1, b_2, \ldots b_t$ each lie within intervals $I_i$, $I_j, \ldots I_k$ and that representation R is statistically distinct from previous representations R. If the test at process step 930 fails, then If the test at process step 930 is failed, meaning, in this implementation, that representation R fails any of subtests i, ii, iii, then process 900 branches to process step 935 from process step 930. At process step 935, process 900 enters a failure mode that may, for example, include rejection of representation R and termination of process 900.

If the test at process step 930 is passed, then process 900 branches from process step 930 to process step 940.

At process step 940, key is linked with the component because only the component can generate a valid representation R for key as indicated by passage of the test at process step 930.

At process step 945, representation R is accepted as validly representing key, and key may be reconstructed using representation R, test set T, and character set char at process step 940.

Because key is now linked uniquely with the component, key may be used in subsequent processes available to the component, per process step 950. Process 900 terminates at process step 961.

Figure 5:
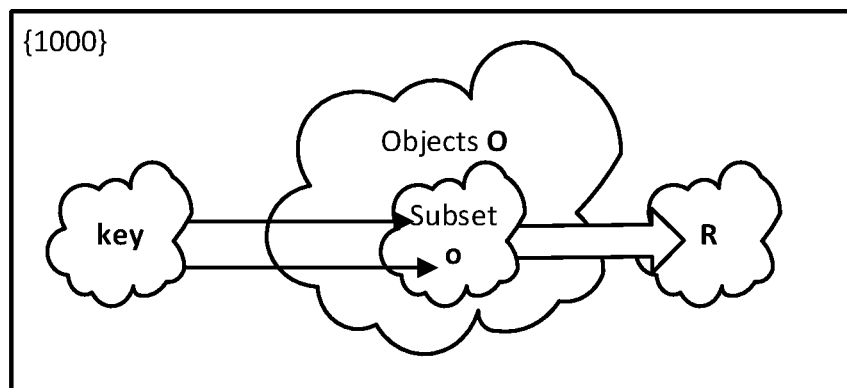
FIG. 5 illustrates by schematic diagram another exemplary process of operation of the exemplary access control apparatus of FIGS. 1A, 2A, and 3A.

Portions of process 900 may be further generalized beyond mapping key to subset S of intervals I that, in turn are mapped onto representation R, where intervals I are defined as intervals on a machine representation of a number line. As illustrated in FIG. 5, in exemplary process 1000, key is mapped to a subset o of objects O and subset o is then mapped onto representation R. Objects O may include any set of objects that may be machine represented, such as, for example, sets of dictionary words, sets of numbers (integers or floating point), hashes of files, character strings, collections of file addresses, collections of IP addresses, pixels in an image, or digital representations of sound patterns.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. The Abstract is not intended to identify key elements of the processes, apparatus and compositions of matter disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A process of linking a key to a component, comprising the steps of:
   identifying said component using environmental variables associated with said component, said component comprising a computer in networked communication;
   generating a test array $T_i$ unique to said component for character $char_i$ wherein said key includes character $char_i$, the test array $T_i = \{(a_{1,1}, a_{1,2}), (a_{2,1}, a_{2,2}), \ldots (a_{p,1}, a_{p,2})\}$ has p ordered pairs that define p intervals $I_1, I_2, \ldots I_p$;
   generating a representation array $R_i$ for character $char_i$, the representation array $R_i = \{b_1, b_2, \ldots b_p\}$ where each $b_i$ is selected at random and each $b_i$ lies within corresponding interval $I_i$ for all i=1 to p;
   forming a representation of said key unique to said component, the representation comprising the representation array $R_i$ corresponding to each of the characters in said key;
   testing the representation against one or more previous representations thereby determining the representation is distinct from the one or more previous representations; and
   testing the representation against possible representations from said component, the possible representations being unique to said component.

2. The process of claim 1, further comprising the step of: performing the step of testing the representation against possible representations from said component by testing that each $b_i$ of representation array $R_j$ lies within the corresponding interval $I_i$ of test array $T_j$ for all i=1 to p where representation array $R_j$ and test array $T_j$ are mapped to character $char_j$.

3. The process of claim 1, wherein the environmental variables include a variable selected from BIOS asset tag, hard-drive serial number, hardware serial number, MAC address, IPv4 Internet address, IPv6 Internet address, GPS location, and state information.

4. The process of claim 1, wherein the representation of said key comprises random values $b_j$ that lie within corresponding random intervals $I_j$, the random intervals $I_j$ being unique to said component.

5. The process of claim 4, wherein the number of random values $b_j$ ranges from about 10 to about $10^7$.

6. The process of claim 1, wherein said key is selected from a group consisting of a password, a hash, an encryption key, a decryption key, a seed value.

7. A non-transitory computer readable media storing a computer program comprising instructions that, when executed, cause a computer to perform the step of linking a key to a component by performing the steps of:
   identifying said component using environmental variables associated with said component, said component comprising a computer in networked communication;
   generating a test array $T_i$ unique to said component for character $char_i$ wherein said key includes character $char_i$, the test array $T_i = \{(a_{1,1}, a_{1,2}), (a_{2,1}, a_{2,2}), \ldots (a_{p,1}, a_{p,2})\}$ has p ordered pairs that define p intervals $I_1, I_2, \ldots I_p$;
   generating a representation array $R_i$ for character $char_i$, the representation array $R_i = \{b_1, b_2, \ldots b_p\}$ where each $b_i$ is selected at random and each $b_i$ lies within corresponding interval $I_i$ for all i=1 to p;
   forming a representation of said key unique to said component, the representation comprising the representation array corresponding to each of the characters in said key;
   testing the representation against one or more previous representations thereby determining the representation is distinct from the one or more previous representations; and
   testing the representation against possible representations from said component, the possible representations being unique to said component.

8. The composition of matter of claim 7, further comprising the step of:
   performing the process step of testing the representation against possible representations from said component by testing that each $b_i$ of representation array $R_j$ lies within the corresponding interval $I_i$ of test array $T_j$ for all i=1 to p where representation array $R_j$ and test array $T_j$ are mapped to character $char_j$.

9. The composition of matter of claim 7, wherein the environmental variables include a variable selected from BIOS asset tag, hard-drive serial number, hardware serial number, MAC address, IPv4 Internet address, IPv6 Internet address, GPS location, and state information.

10. The composition of matter of claim 7, wherein the representation of said key comprises random values $b_j$ that lie within corresponding random intervals $I_j$, the random intervals $I_j$ being unique to said component.

11. The composition of matter of claim 10, wherein the number of random values $b_j$ ranges from about 10 to about $10^7$.

12. The composition of matter of claim 7, wherein said key is selected from a group consisting of a password, a hash, an encryption key, a decryption key, a seed value.

* * * * *